United States Patent [19]

Neumann

[11] 4,365,915
[45] Dec. 28, 1982

[54] FLUID RAIL CONVEYING APPARATUS

[75] Inventor: John W. Neumann, Birmingham, Mich.

[73] Assignee: Occidental Chemical Corporation, Warren, Mich.

[21] Appl. No.: 969,426

[22] Filed: Dec. 14, 1978

Related U.S. Application Data

[62] Division of Ser. No. 822,428, Aug. 8, 1977, Pat. No. 4,144,021, which is a division of Ser. No. 649,836, Jan. 16, 1976, abandoned.

[51] Int. Cl.$^3$ .............................................. B65G 51/02
[52] U.S. Cl. ..................................................... 406/88
[58] Field of Search ...................... 302/2 R, 29, 31, 64; 406/88

[56] References Cited

U.S. PATENT DOCUMENTS

| | | | |
|---|---|---|---|
| 2,342,680 | 2/1944 | Melzer | 302/2 R X |
| 3,210,124 | 10/1965 | Niemi et al. | 302/2 R |
| 3,782,791 | 1/1974 | Neumann et al. | 302/2 R X |
| 4,010,981 | 3/1977 | Hodge | 302/2 R |

Primary Examiner—Jeffrey V. Nase
Attorney, Agent, or Firm—Harness, Dickey & Pierce

[57] ABSTRACT

An apparatus for conveying articles on a cushion of fluid including a longitudinally extending rail defined by a plurality of longitudinally extending members each having a supporting surface oriented in opposed relationship with respect to the supporting surface of the other said members. Each member is formed with a plurality of ports in the supporting surface thereof which are disposed in communication with a plenum connected to a supply of pressurized fluid for discharge from the ports to support and convey an article on a cushion of fluid and in spaced relationship from the supporting surfaces. A shroud is provided along a portion of the length of the rail extending between the members to restrict escape of fluid discharged from the ports laterally between the supporting surfaces to impart an axial flow pattern of the fluid along the shrouded section and to impose a braking force on the articles as they approach the upstream end of the shroud.

5 Claims, 14 Drawing Figures

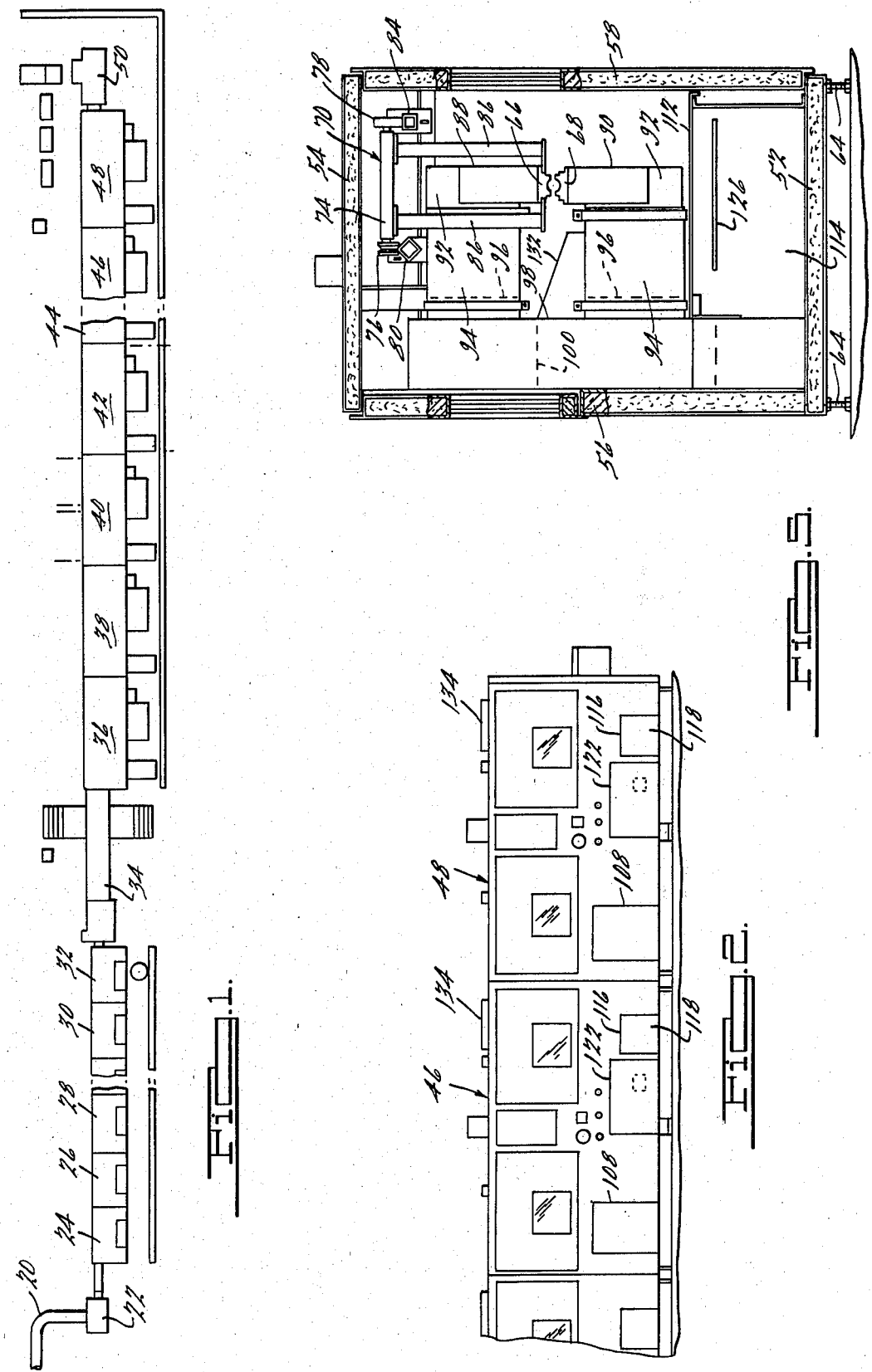

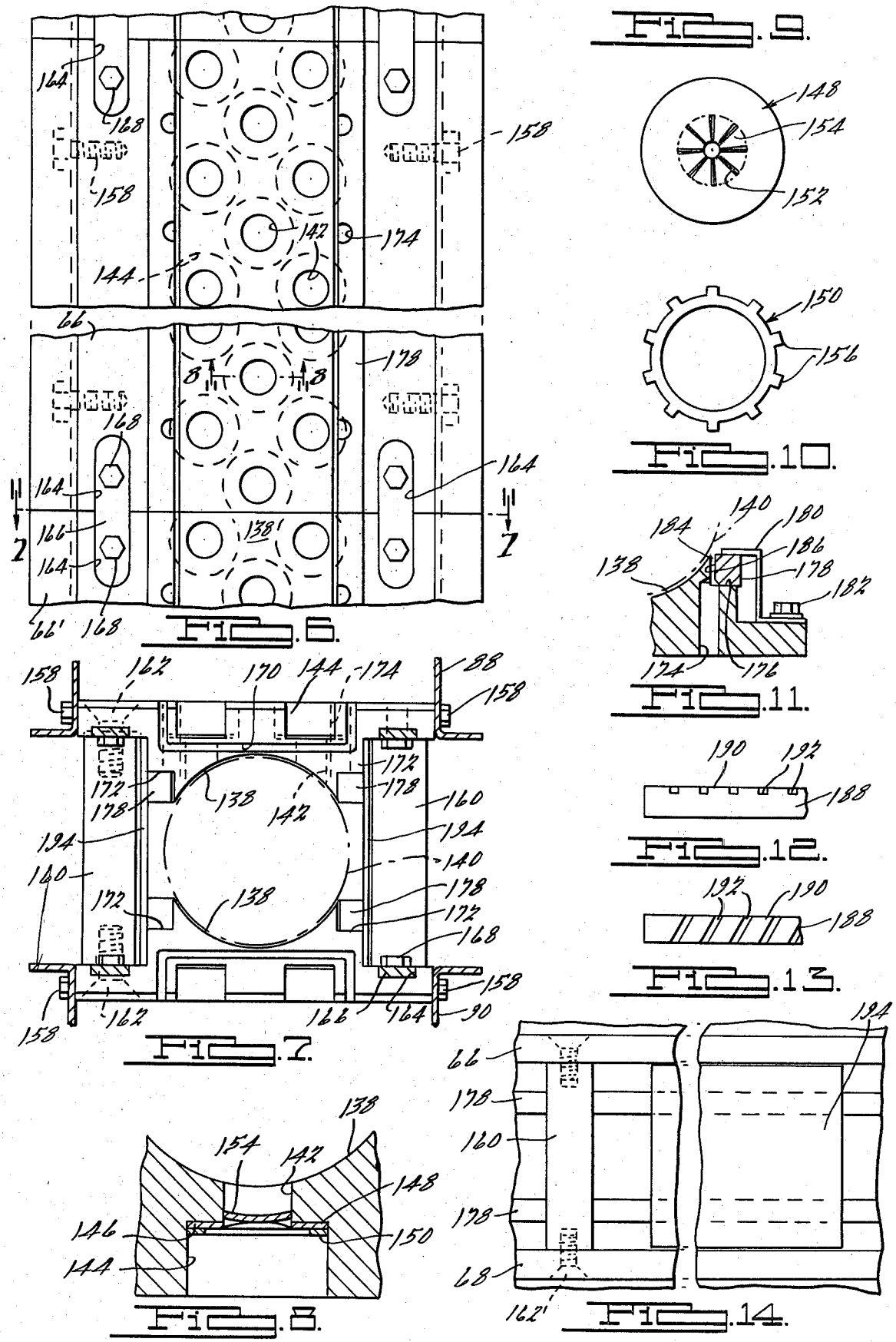

FLUID RAIL CONVEYING APPARATUS

This application is a divisional of copending application Ser. No. 822,428, filed Aug. 8, 1977 now U.S. Pat. No. 4,144,021 which is a divisional of prior application, Ser. No. 649,836, filed Jan. 16, 1976, now abandoned.

BACKGROUND OF THE INVENTION

A variety of devices and systems have heretofore been used or proposed for use for supporting articles on a cushion of fluid, such as air, facilitating transport and conveyance of the articles due to the extremely low frictional characteristics of such fluid cushion. A recent technological breakthrough in fluid bearing devices of the foregoing type is disclosed in U.S. Pat. No. 3,904,255, which is assigned to the same assignee as the present invention. The apparatus of the present invention constitutes still a further improvement over the device disclosed in the aforementioned U.S. patent, providing an apparatus which is particularly adapted, but not necessarily restricted, to the conveyance and processing of containers of the general type which are in widespread use for packaging various foodstuffs, including beverages or the like, between the initial forming operation and the final filling and sealing operation.

Containers employed in the packaging of foodstuffs conventionally are comprised of a variety of materials providing for a thin-walled resilient construction, such as, for example, various plastic materials, tin-plated steel, plastic-lined steel, aluminum and the like. Containers comprised of aluminum, for example, are produced by the deep-drawing, or a draw and re-draw, or a draw and ironing, of an aluminum blank employing modern automatic machines which are capable of production rates presently as high as about 200 container bodies per minute. The resultant container bodies, after the forming operation, are trimmed along their open upper edge and thereafter are subjected to various cleaning and coating operations before entering the filling operation.

Suitable apparatuses and methods for effecting a high-speed treatment of the surfaces of such container bodies are disclosed in U.S. Pat. Nos. 3,704,685 and 3,748,177, which are owned by the same assignee as the present invention. In accordance with the teachings of the aforementioned U.S. patents, longitudinally extending guide rods are provided for supporting the container bodies as they are propelled therealong in longitudinally spaced end-to-end relationship and the workpieces are subjected to a plural liquid treatment by the impingement of high pressure liquid streams against the inner and outer surfaces thereof.

Following the treatment of the container bodies, or between successive treating stations, the containers are transferred by various conveying systems of which a fluid conveying system to which the present invention is applicable is particularly effective in that the container body is supported on a cushion of air, minimizing friction during transport, while also enabling a setting or drying of the coated surfaces to an extent that the container bodies can be handled without a marring or damage to the coatings thereon.

It is an objective of the present invention to provide a fluid bearing conveyor system for articles such as container bodies or the like, which is commercially adaptable to transport systems between high-speed fabricating or treating stations, which in accordance with one of its embodiments, provides for a heating of the article during its conveyance so as to effect a drying thereof or a curing or setting of coatings on the article during the course of its conveyance, and which in another embodiment thereof provides for a modular construction consisting of a series of assemblable sections, providing for increased versatility in adapting the fluid conveying system to different operating situations.

SUMMARY OF THE INVENTION

The benefits and advantages of the present invention are achieved by an apparatus including a framework on which a longitudinally extending member is mounted incorporating a supporting surface defining a rail which has a transverse configuration conforming substantially to the configuration of an article adapted to be conveyed therealong. The rail is formed with a plurality of ports therein which are disposed in communication with a plenum which in turn is connected to a fluid supply for introducing a pressurized fluid to the plenum for discharge from the ports in the rail for supporting and conveying an article along the rail on a cushion of fluid in spaced relationship relative to the supporting surface. In accordance with one embodiment of the present invention, each of the ports in the rail comprise a bore having an apertured disc mounted therein incorporating deflector vanes for imparting a preselected helical flow pattern to the fluid discharged therefrom. The rail further includes nozzles extending longitudinally along at least one lateral edge of the rail for discharging the fluid against an article in a manner to impart rotational movement thereto and to further control the speed of conveyance thereof. A valve rod is adjustably mounted for controlling the magnitude of fluid discharged from the nozzles.

In accordance with a further embodiment of the present invention, the rail is mounted within an enclosure whereby a controlled portion of the fluid discharged from the rail is recovered and recirculated through the fluid supply for reuse. The fluid supply also includes a heating device for heating the fluid to a controlled elevated temperature, whereby a heating of the articles being conveyed is effected to provide a selected heat treatment thereof during the course of their conveyance along the rail. In accordance with a preferred embodiment, the rail and enclosure are formed in sections of a preselected length which are adapted to be connected in end-to-end aligned relationship, providing an enclosed fluid conveyor section of the desired length to provide the necessary residence time of the articles conveyed therethrough.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a fragmentary schematic plan view of a process incorporating a modular fluid conveying rail system in accordance with the present invention;

FIG. 2 is a fragmentary side elevational view of the modular fluid conveyor rail system;

FIG. 5 is an end elevational view of the unit shown in FIG. 3 with the end panel thereof removed;

FIG. 6 is a fragmentary enlarged plan view of the fluid air rail illustrating the disposition of the discharge ports therealong;

FIG. 7 is an end elevational view of the rail shown in FIG. 6;

FIG. 8 is a fragmentary magnified cross sectional view through a discharge port of the rail shown in FIG. 6 and taken substantially along the line 8—8 thereof;

FIG. 9 is a plan view of an apertured disc employed in the discharge ports of the rail;

FIG. 10 is a plan view of a disc retainer;

FIG. 11 is a fragmentary cross sectional view of a valve rod and the nozzles disposed along a lateral edge of the rail;

FIG. 12 is a fragmentary plan view of a slotted valve rod in accordance with an alternative embodiment of the present invention;

FIG. 13 is a side elevational view of the slotted valve rod shown in FIG. 12; and FIG. 14 is a fragmentary side elevational view of a fluid conveying rail incorporating a side baffle for controlling the acceleration and deceleration of articles conveyed therealong.

DESCRIPTION OF THE PREFERRED EMBODIMENTS

Figure 3:
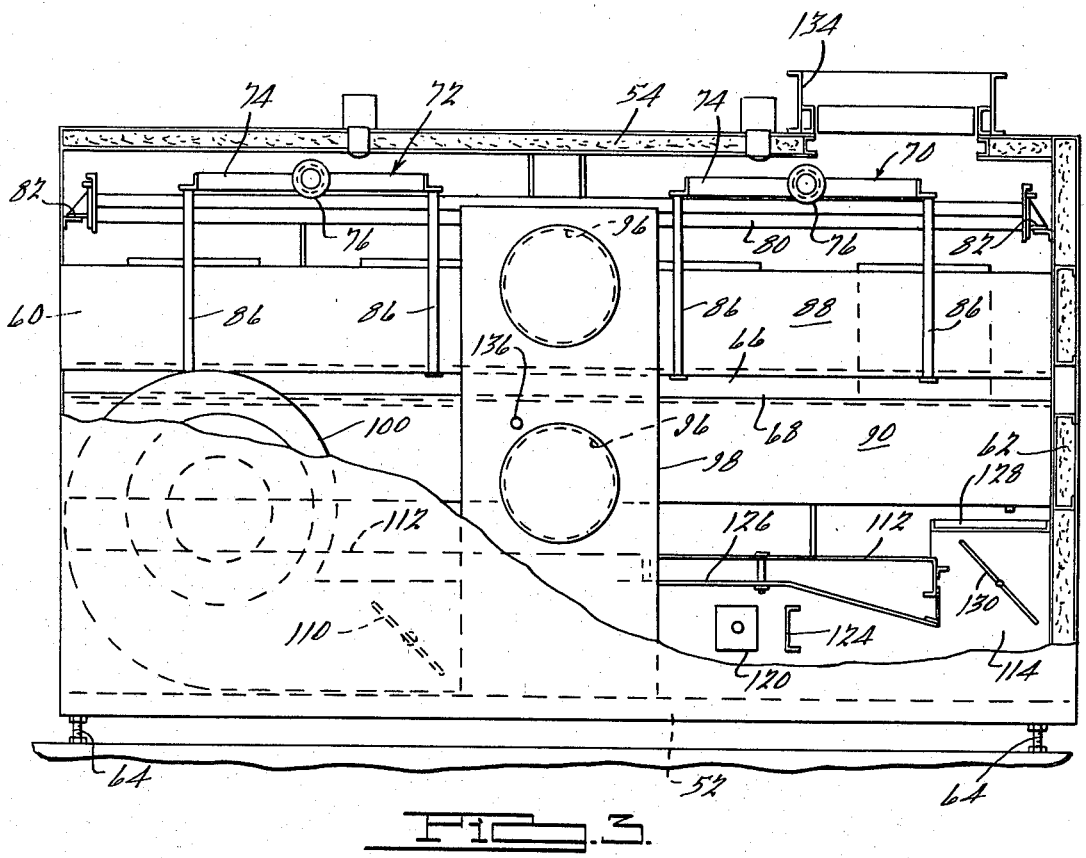
FIG. 3 is an enlarged side elevational view of a modular fluid conveying unit with the side panel thereof removed to reveal the interior structure thereof.

Referring now in detail to the drawings, and as may be best seen in FIG. 1, an arrangement employing a modular or sectionalized fluid rail conveying apparatus is depicted which is disposed to receive articles or workpieces discharged from a multiple-stage processing cycle. The specific embodiment illustrated in FIG. 1 is typical of an arrangement for processing aluminum or other metallic container bodies of the types employed for use in packaging beverages or the like, in which the container bodies or workpieces are introduced from the container forming operation (not shown) through a supply conduit 20 to a feeding device 22, in which the container bodies are oriented in axial aligned relationship and are advanced through a series of processing units indicated at 24, 26, 28, 30, 32.

The processing units may typically comprises apparatuses of the types disclosed in U.S. Pat. Nos. 3,704,685 and 3,748,177, which are effective for performing a high-speed surface treatment of such container bodies. Briefly stated, the apparatus in accordance with the teachings of the aforementioned U.S. patents includes longitudinally extending guide rods for supporting the articles or container bodies as they are advanced in longitudinally spaced end-to-end relationship, wherein the closed ends of the container bodies are oriented in the leading position. As the containers pass through each processing unit, they are subjected to a liquid treatment by the impingement of high pressure liquid streams against the inner and outer surfaces thereof to provide a desired sequentially-phased plural liquid treatment thereof. Treatments of the foregoing type may conventionally comprise a cleaning treatment to effect a removal of contaminating substances such as die lubricants from the exterior and interior surfaces of the container bodies, followed by an application of a chemical conversion coating, such as a chromate coating, to the cleaned surfaces, thereby improving the resistance of the container to chemical attack and to further render the surface more receptive to overlying decorative coatings.

Upon emergence from the last processing unit 32, the containers are transferred by a connecting conduit 34 into the first fluid rail conveying unit 36, whereafter they are conveyed through succeeding units 38, 40, 42, 46, 48, and are discharged into a receiving mechanism 50, from which they are transferred for further final processing and ultimate filling. The conveying units as depicted in FIG. 1 may conveniently be employed to perform a drying operation on the processed container bodies to remove any residual treating solutions and/or rinse water from the surfaces thereof prior to the succeeding coating operation. Alternatively, the conveying units can be employed to perform a heat treatment of the containers to effect a curing or setting of the coatings applied thereto during the preceding processing operation. In any event, it will be understood that while the present invention as herein disclosed is described with particular applicability for the processing of metallic container bodies, it will be appreciated that the fluid rail conveying apparatus is equally applicable for the fluid conveyance of articles of alternative configuration employing a fluid and an atmosphere of controlled composition and temperature to achieve a desired result.

Each of the conveying units, such as the units 46, 48 illustrated in FIG. 2, are of substantially identical structure and comprise self-contained units, enabling assembly thereof in end-to-end aligned relationship to provide a conveying system of the desired length. In the specific arrangement illustrated, the units are employed for performing a conveying and drying function utilizing heated air as the fluid medium. The independent operating nature of each unit enables a controlled progressive heating of the container articles to the desired elevated temperature as they are conveyed from one end to the discharge end of the system.

As best seen in FIGS. 2-5, each of the conveying units, such as the unit 46, comprises an elongated three-dimensional enclosure as defined by a floor panel 52, a top panel 54, side panels 56, 58 and end panels 60, 62. Each of the aforementioned panels are of a thickness to accommodate a heat insulation material to minimize heat transfer from and to the interior of the enclosure. The floor panel is provided with leveling screws 64 to facilitate vertical end-to-end alignment of one unit with the adjacent unit.

An air rail assembly as defined by two vertically opposed longitudinally extending members 66, 68 extends substantially horizontally between the end panels 60, 62 and is supported for restricted longitudinal movement from the enclosure framework by means of a pair of carriage assemblies 70, 72. Each of the carriage assemblies is comprised of a rectangular frame 74 having a V-groove roller 76 rotatably affixed to one side thereof and a flat roller 78 rotatably affixed to the opposite side thereof. The V-groove roller of each carriage is disposed in rolling supported relationship on a track member 80 of a diamond-shaped cross section extending between the end panels and affixed thereto by adjustable brackets 82. The flat rollers 78 are disposed in rolling supported contact on the flat surface of a track member 84 which also extends between the end panels of the enclosure and is supported by similar adjustable brackets 82. A downwardly depending L-shaped leg 86 is affixed to each corner of the rectangular frame 74 of each carriage assembly at its upper end and the lower inwardly extending flange is in turn secured to the upper rail member 66. Restricted movement of the carriage assemblies along the track members 80, 84, enables compensation for linear expansion and contraction of the rail members in response to changes in the temperature thereof, maintaining continuity and alignment of the rail.

Figure 4:
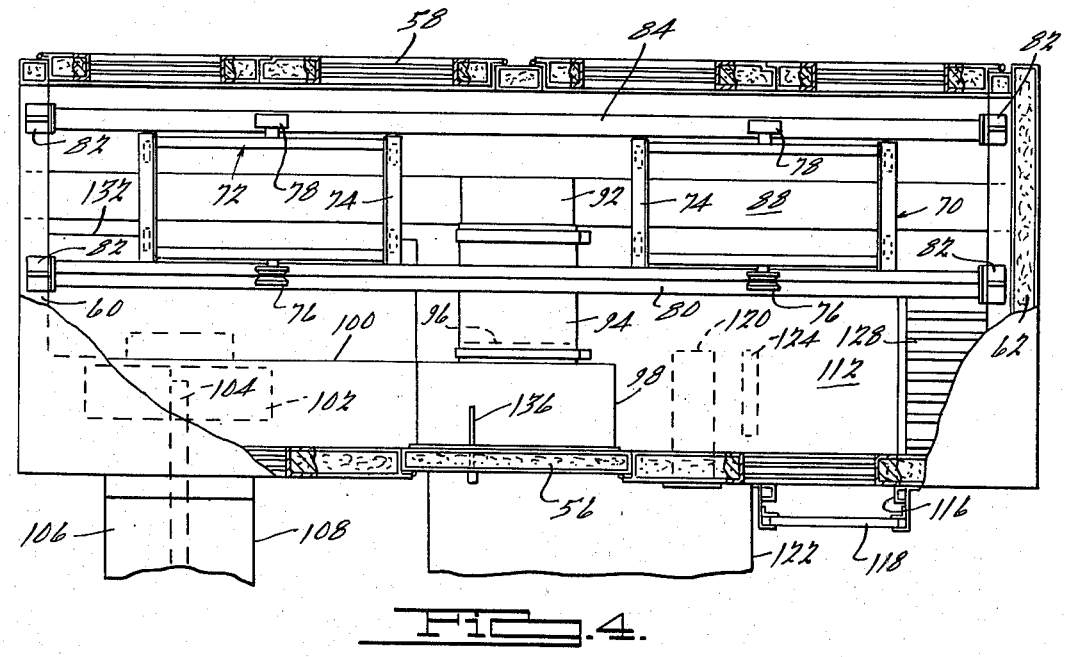
FIG. 4 is a plan view of the unit shown in FIG. 3 with the top panel thereof removed.

An elongated plenum 88 is affixed to the upper surface of the upper rail member 66 and a similar elongated plenum 90 is affixed to the lower surface of the lower rail member 68. A transition duct 92 formed with a circular opening is connected to the central portion of the upper and lower plenums to which one end of a flexible circular boot 94 is secured in fluid-tight relationship. The opposite end of the boot is affixed to circular outlets 96 provided in a vertically disposed supply duct 98 disposed adjacent to the inner surface of the side panel 56. The lower left-hand side of the supply duct 98, as best seen in FIGS. 3 and 4, is connected to the outlet duct of a scroll-type blower housing 100, in which a fan wheel 102 mounted on a fan shaft 104 is disposed. The fan shaft extends through a suitable aperture provided in the side panel 56 and is drivingly connected to a motor 106 mounted within a motor housing 108. As best seen in FIG. 3, the outlet of the blower housing 100 is provided with a pivotally mounted damper 110 which is adjustably positionable so as to control the quantity of air discharged into the supply duct 98.

As best seen in FIGS. 3 and 5, a horizontal panel 112 is positioned in spaced relationship upwardly from the floor panel 52 and extends between the side panels and end panels and in sealed relationship around the supply duct and blower scroll, forming an air supply chamber indicated at 114 in FIGS. 3 and 5. An inlet opening 116 is provided in the side panel 56, including a disposable filter element 118 which is disposed in communication with the air supply chamber 114 for admitting make-up air to the supply system. A cylindrical firing tube 120 extends inwardly of the side panel adjacent to the inlet 116 and into the supply chamber 114 in which a gas burner is positioned for heating the air within the supply chamber. The burner supply and firing controls are mounted within a burner housing 122, positioned exteriorly of the side panel 56. An air deflector plate 124 is disposed within the supply chamber 114 between the firing tube and air inlet to provide the desired air inlet flow pattern and an angular baffle 126 is suspended in spaced relationship from the horizontal panel 112 in the region of the firing tube to prevent direct contact of the burner flames against the underside of the horizontal panel.

The right-hand end of the horizontal panel 112, as viewed in FIGS. 3 and 4, is formed with a grill inlet 128 equipped with a pivotally mounted adjustable damper 130 for controlling the amount of air recirculated from the interior of the enclosure to the supply chamber for recirculation through the system to the air rail members. The left-hand end of the horizontal panel 112, as viewed in FIGS. 3 and 4, is formed with a transition duct 132, which connects the interior of the supply chamber to the inlet side of the blower housing. The top panel 54 of the conveyor unit is also formed with an exhaust duct 134 connected to a suitable exhaust system (not shown) through which a controlled proportion of the air from the interior of the conveying unit is exhausted to the atmosphere.

In accordance with the air supply and heating and recirculation system hereinabove described, filtered make-up air enters the inlet 116 and is admixed with a controlled proportion of recirculated air entering the grill inlet 123 which in turn become heated with the combustion gases discharged from the firing tube 120 to a controlled preselected elevated temperature, whereafter the admixed heated gases pass longitudinally along the supply chamber and pass through the transition duct 132 into the blower housing and are discharged under a controlled pressure into the supply duct 98. The heated gases thereafter pass through the circular boots 94 into the upper and lower plenums 88, 90, respectively, and are subsequently discharged from a plurality of ports in the rail members to maintain the articles conveyed therealong suspended on a cushion of air in a manner subsequently to be described in greater detail. The air thus discharged from the rail members passes into the interior of the conveying unit enclosure and a portion thereof is discharged through the exhaust duct 134, while the balance thereof is recirculated through the recirculation grill inlet 128. The quantity of air recirculated is controlled so as to avoid an excessive amount of humidity in the air supplied to the rail members when the conveying unit is employed for drying purposes, while at the same time conserving heat energy present in the recirculated air. When the conveyor unit is employed for purposes other than heating, the ratio of recirculated air to make-up air is controlled so as to maintain a proper composition and heat balance of the air or fluid supplied to the rail members. Typically, in the adaptation of the conveying unit for drying water-rinsed metallic container bodies, the air passing into the supply duct as sensed by a suitable thermal probe, indicated at 136 in FIG. 3, is controlled at a temperature of about 400° F. by a controlled firing of the burner assembly through control means (not shown) of any of the types well known in the art which is located in the burner housing 122. The quantity of air recirculated in such situation is controlled to prevent saturation of the air with moisture so as to provide an efficient drying of the container bodies passing along the rail members.

Referring now more particularly to the air rail assembly as shown in FIGS. 7–11, the upper and lower rail members 66, 68 are of identical construction and cross sectional configuration and are provided with an arcuate supporting surface 138 which is of a partial circular transverse configuration substantially conforming to the circular cross sectional configuration of an article, such as a container 140 indicated in phantom in FIG. 7. Each member is provided with a plurality of discharge ports 142 disposed at triangular spaced centers along the supporting surface in a uniform repetitive pattern and in the specific embodiment shown, the ports are disposed with their axes in parallel relationship. It will also be understood that the axes of the discharge ports 142 can be oriented substantially perpendicular to the plane tangent to the supporting surface at the point of intersection of the axis with the surface, as well as at controlled angles relative thereto to provide the desired fluid conveyance.

Each discharge port 142 is disposed in axial alignment with an enlarged bore 144 extending inwardly from the opposite surface of the rail member defining at their intersection, an annular shoulder 146, as may be best seen in FIG. 8, on which an apertured disc 148 is disposed in seated engagement and retained by a star washer 150. The apertured disc, as best seen in FIGS. 8 and 9, is formed with a plurality of pie-shaped perforations 152 and is integrally formed with an angularly offset deflector vane 154 extending along one side of each perforation for deflecting the air discharged through the perforations in a manner to impart a helical flow pattern to the air passing outwardly of the discharge ports. The helical flow pattern forms a vortex at each of the discharge ports which is operative to simultaneously apply an attractive and a separating force to an article, such as the cylindrical container 140, conveyed between the two rail members maintaining the peripheral surface of the container separated from the rail supporting surfaces on a cushion of air. The operational principles and advantages in accordance with this preferred embodiment of the present invention is more fully described in U.S. Pat. No. 3,904,255, which is also assigned to the same assignee as the present invention and the teachings of which are incorporated herein by reference.

The retention of the apertured disc 148 in firm abutting relationship against the annular shoulder 146 is achieved by the engaging tabs 156 around the periphery of the star washer 150, as best seen in FIG. 10, which upon assembly in accordance with the arrangement illustrated in FIG. 8, become interlocked against the surface of the enlarged bore 144. The upper plenum 88 and the lower plenum 90, as fragmentarily shown in FIG. 7, are secured in sealing engagement against the longitudinally extending side edges of each of the rail members by means of a series of screws 158.

The upper and lower rail members 66, 68 are maintained in precise vertically spaced aligned relationship by means of a series of spacer rods 160 extending between and firmly seated against the opposed faces of the side flanges of the rail members and securely fastened thereto by means of screws 162. In accordance with this arrangement as illustrated in FIG. 7, the arcuate supporting surfaces 138 of the rail members are positioned in clearance relationship with respect to the periphery of the container 140 and are separated therefrom by a cushion of air discharged from the discharge ports 142. The spacer rods 160 further suspend the lower rail members 68 and the lower plenum 90 from the upper rail member, which in turn is supported by the carriage assemblies.

In accordance with the modular construction of the conveying units, the upper and lower rail members are of a sectionalized construction providing for assembly of units in end-to-end alignment, wherein the rail members are fastened in longitudinal and vertical alignment providing for continuity of the fluid conveying rail. As best seen in FIG. 6, the faces of the side flanges adjacent to the abutting ends of adjacent rail members 66, 66' are formed with precisely machined slots 164 in which a precisely machined key 166 is adapted to be securely affixed by means of screws 168. The disposition of the discharge ports adjacent to the end portion of the rail members 66 and the abutting end of the adjacent rail member 66' is such as to maintain continuity of the pattern of discharge ports assuring uniformity in the supporting air cushion on which the containers are conveyed. Since the discharge ports overlap the parting edge as defined by the abutting ends of the rail members 66, 66', as shown in FIG. 6, the end face of the rail member 66 is formed with a U-shaped groove 170, as best seen in FIG. 7, in which a resilient sealing gasket is adapted to be disposed in compressed sealing relationship. The end panels 60, 62 are provided with aligned openings through which the projecting ends of the rail assemblies extend, facilitating an aligned connection therebetween.

Each of the rail members is formed with a longitudinally extending square shoulder 172 immediately adjacent to and laterally of the arcuate supporting surface in which a plurality of apertures or nozzles 174 are formed which extend from the face 176 of the shoulder 172 inwardly to the rear surface of the rail member and in communication with the pressurized air in the plenum. A valve rod 178 of a generally rectangular configuration is disposed in adjustable seated engagement on the face 176 of the shoulder by means of a series of Z-shaped clamps secured by screws 182. The valve rod 178 is adjustably positionable from a first position in which it is disposed in complete blocking relationship with respect to the outlet of the nozzles 174 to a second position spaced therefrom, such as shown in FIG. 11, permitting air to pass outwardly of the nozzle through a longitudinally extending gap 184 in the form of a substantially curtainous fluid stream.

The lateral disposition of the gap 184 and the curtainous fluid stream discharged therefrom, as best seen in FIGS. 7 and 11, causes the curtainous stream to impinge against the periphery of the container 140 projecting laterally of the supporting surfaces of the rail members applying a tangential force thereto so as to impart rotation to the containers during the course of their conveyance. By selectively positioning diametrically opposed valve rods of the upper and lower rail members in an appropriate position, the desired clockwise or counterclockwise rotation of the containers can be achieved, which facilitates uniformity in their heating and drying or curing of films thereon during the course of their conveyance along the rails.

In the embodiment of the valve rod 178 illustrated in FIGS. 7 and 11, the inward surface 186 is substantially planar, whereby the curtainous stream is discharged in a direction generally perpendicular to the direction of travel of the containers. In accordance with the embodiment illustrated in FIGS. 12 and 13, a valve rod 188 is illustrated in which the inward face 190 thereof is formed with a plurality of diagonally-extending grooves or slots 192 which impart a directional component to the curtainous stream of air discharged from the nozzles in a manner so as to assist or retard the translatory movement of the containers along the rail members.

A controlled deceleration or braking of the speed of the containers during their travel along the rail members is also achieved, as best seen in FIGS. 7 and 14, by means of side baffles 194 adjustably positioned along selected lengths of each side of the rail members and disposed in substantial sealing relationship against the outer faces of the shoulders 172 defining a shroud. The disposition of the side baffles 194 prevents lateral escape of the air discharged from the discharge ports, causing a longitudinal flow thereof through the tunnel formed in both a forward and rearward direction. The rearward flow component of the air in the baffled section opposes the translatory movement of the containers, providing for a controlled deceleration or braking thereof as a function of the length of the side baffles and the volume of air discharged from the discharge ports.

While it will be apparent that the invention herein described as well calculated to achieve the benefits and advantages set forth above, it will be appreciated that the invention is susceptible to modification, variation and change without departing from the spirit thereof.

What is claimed is:

1. An apparatus for conveying articles comprising a framework, a plurality of longitudinally extending members defining a rail supported by said framework, each of the members formed with a supporting surface oriented in opposed relationship with respect to the supporting surface of the other side members and formed with a transverse configuration conforming substantially to the configuration of an article adapted to be conveyed therebetween, each of said members formed with a plurality of ports in the supporting surfaces thereof, means defining a plenum connected to said members and disposed in communication with the plurality of said ports therein, supply means for supplying a fluid under pressure to said plenum for discharge from said ports for supporting and conveying an article along said rail on a cushion of fluid in spaced relationship relative to said supporting surfaces, and baffles defining a shroud extending between said members along a portion of the length thereof to restrict escape of fluid discharged from said ports laterally between said supporting surfaces to impart an axial flow pattern to said fluid along the tunnel formed in both a forward and rearward direction with the rearward flow opposing the translatory movement of the articles being conveyed effecting a deceleration thereof upon approaching the upstream end of said shroud.

2. The apparatus as defined in claim 1 comprising two said members having the supporting surfaces thereof disposed in diametrically opposed relationship.

3. The apparatus as defined in claim 1 wherein the articles being conveyed are of a circular cylindrical configuration and said supporting surface is of an arcuate transverse conforming configuration.

4. The apparatus as defined in claim 1 in which said supporting surface is of a partial substantially circular transverse configuration.

5. The apparatus as defined in claim 1 in which said baffles are adjustably positioned along selected lengths of said longitudinally extending members.

* * * * *

UNITED STATES PATENT AND TRADEMARK OFFICE
CERTIFICATE OF CORRECTION

PATENT NO. : 4,365,915

DATED : December 28, 1982

INVENTOR(S) : John W. Neumann

It is certified that error appears in the above-identified patent and that said Letters Patent is hereby corrected as shown below:

Column 6, line 1 - "123" should be --128--

Column 8, line 64 - "as" should be --is--

Column 9, line 6 - "side" should be --said--

Signed and Sealed this

Twenty-sixth Day of April 1983

[SEAL]

Attest:

Attesting Officer

GERALD J. MOSSINGHOFF

Commissioner of Patents and Trademarks